Figure 3:
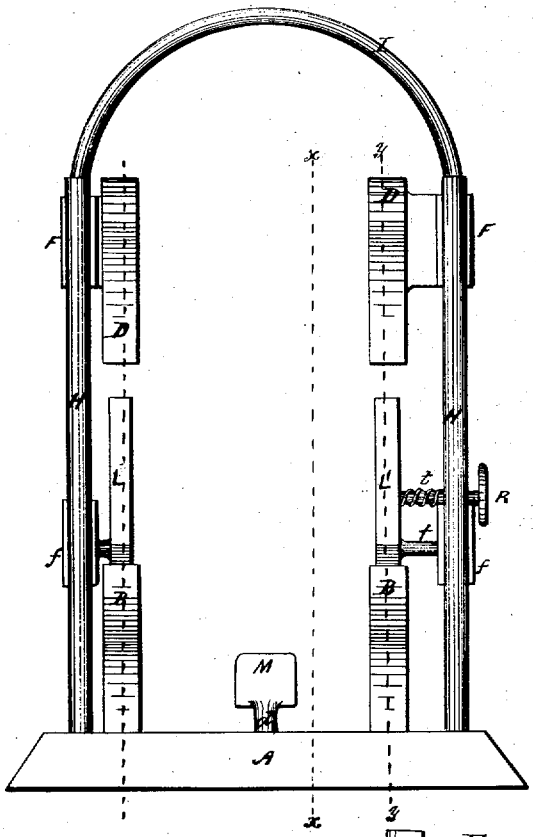

2 Sheets--Sheet 1.
EDWARD T. COVELL.
Machines for Closing Seams of Metallic Cans.
No. 4,777. Reissued March 5, 1872.
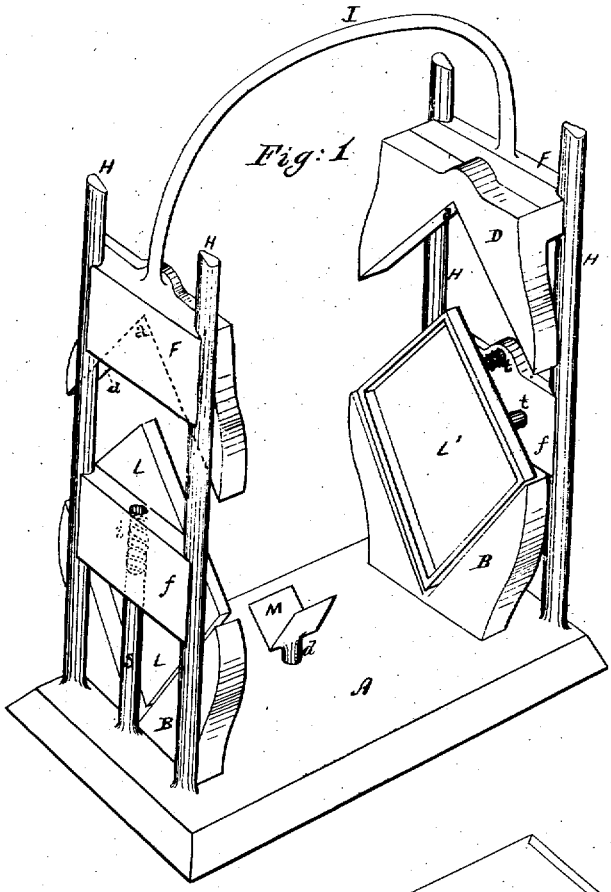
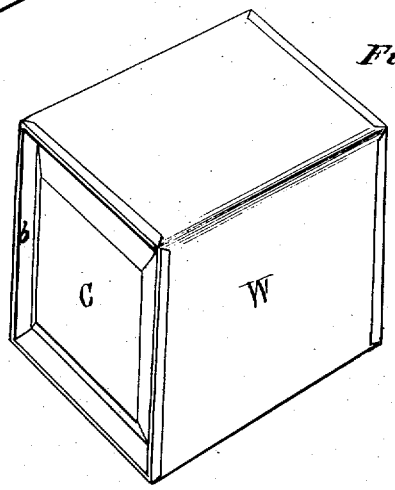
WITNESSES
H. H. Young
Ewell A. Dick
E. T. Covell Inventor
By David A. Burr Atty.

2 Sheets--Sheet 2.

EDWARD T. COVELL.

Machines for Closing Seams of Metallic Cans.

No. 4,777. Reissued March 5, 1872.

WITNESSES
E. H. Young
Ewell A. Dick

E. T. Covell
Inventor
By David A. Burr
Atty.

UNITED STATES PATENT OFFICE.

EDWARD T. COVELL, OF BROOKLYN, NEW YORK.

IMPROVEMENT IN MACHINES FOR CLOSING SEAMS OF METALLIC CANS.

Specification forming part of Letters Patent No. 94,947, dated September 21, 1869; antedated September 10, 1869; reissue No. 4,777, dated March 5, 1872.

DIVISION A.

SPECIFICATION.

I, EDWARD T. COVELL, of Brooklyn, in the county of Kings and State of New York, have invented an Improvement in Machinery for Closing and Clamping the End Joints of Sheet-Metal Cans, of which the following is a specification:

My invention relates to the construction of machinery for closing, clamping, and pressing down the seams forming projecting joints at the top and bottom of a sheet-metal can or other vessel; and it consists, first, of an end or head supporting plate or anvil to bear against the top or bottom of a sheet-metal can or other vessel, and to fit accurately within, and afford support to, the edges of the projecting joint or seam thereof, so arranged between clamping-jaws closing upon any portion of the joint or seam as that said head-plate may yield and move in the same direction as the movable jaw; the object of this part of my invention being to obviate the necessity of obtaining an exact adjustment of the head-plate or anvil where the jaws both move, and also to permit the use of a fixed jaw, in combination with a movable jaw, in clamping the end-joints of a can. It consists, second, in so arranging one of the two head-plates or anvils used in combination with the clamping-jaws for compressing and closing the joints at the top or bottom of a sheet-metal can or other vessel as that said head-plate or anvil, made to fit within the projecting edges of said vessel, may move to or from the plane of movement of the jaws and be forced toward the can to produce pressure simultaneously upon both ends thereof, to hold the ends in place until clamped by the jaws, and be also withdrawn therefrom to admit of a ready removal of the can after the seams of the vessel have been clamped. It consists, third, in the use and arrangement of opposite clamping-jaws or compressing-plates, formed and shaped to fit upon and clamp between them the entire joint at either end of the can at one operation, in combination with a movable or stationary head-plate or anvil, made to fit within the projection formed by the joint to be closed; the object of this part of my invention being, in the case of angular cans, to perfect the corners or angles at the top or bottom of the can simultaneously with the closing and clamping of the entire seam at the top or bottom of the can, and to produce thereby a more perfect joint than can be obtained in machines in which the top and bottom seams are closed by clamping-jaws, which, bearing only against the sides of the head, do not embrace the corners or angles thereof.

Figure 4:
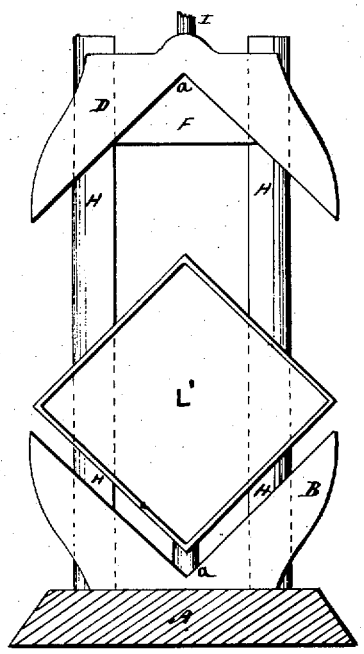

In the accompanying drawing, Figure 1 is a view in perspective of one form of machine embodying my invention, and in which the clamping-jaws have vertical movement. This machine is adapted to close and clamp simultaneously the joints at both ends of the can. Fig. 2 is a view in perspective of a can with its heads or ends placed loosely thereon, ready to be closed and clamped. Fig. 3 is a side elevation of said machine. Fig. 4 is a transverse section thereof in the line *x x* of Fig. 3, with the clamping-jaws opened; and Fig. 5, a like section in line *y y* of Fig. 3, illustrating the clamping-jaws when closed upon the joint or seam of the can.

Figure 5:
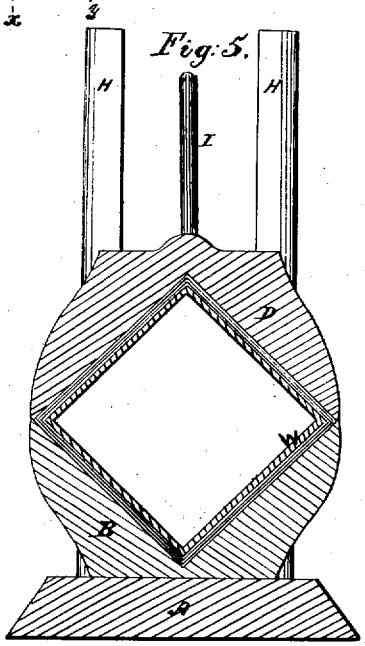

B D in said drawing are the clamping-jaws of my improved apparatus, arranged to meet in pairs, and which are each shaped or cut out to form a notch, *a*, to embrace and fit closely and accurately upon a section or portion of the joint at the end of the can, as shown in Fig. 5, so that when brought together they will include and cover the whole joint and bear evenly upon every point thereof. In the machine illustrated by the drawing the jaws are arranged in pairs to embrace simultaneously both the top and bottom joints of a can, the lower jaw B in each pair being secured to a suitable bed-plate or table, A, while the upper jaws D work each upon or between upright guides or standards H H so as to close accurately upon the lower fixed jaws, as shown in Fig. 5. The upper sliding-jaws D D are connected by a transverse rod or bar, I, so that they may both move simultaneously. A movement thereof, with sufficient force to clamp, compress, and fold down tightly the joints of the can, is obtained by means of the cams or levers of a suitable power-press driven by any desired motive power, or by means of a drop-press. Instead of arranging the jaws B D vertically, as described and illustrated, I contemplate working them horizontally upon a bed-plate, A, and in such case both of the jaws may be arranged to slide and meet upon and close over the end joint of the can. W (Fig. 2) represents a can to be operated upon. L L′ are head-plates or anvils, adapted to fit accurately against either head or end C of the can W within the flange formed by its projecting end joint or seam *b* so as to afford an inner support to said joint to resist an outward pressure thereon. These head-plates are secured to guide-blocks *f f*, sliding upon or between the standards H H, and are supported between the jaws, each by means of a rod, S, projecting from the bed-plate between the standards, and bearing each upon a spring, *i*, (dotted lines, Fig. 1,) inclosed in a recess in its appropriate guide-plate, so that when the upper jaws are closed thereon they will yield to and move with said upper jaws until they are brought down into contact with the lower jaws, as shown in Fig. 5. This movement of the intermediate head-plate or anvil L is secured, when the jaws are placed horizontally, by allowing it to slide in ways parallel with those in which the jaws move, against springs secured on either side thereof, such ways being the equivalent of the guide-ways upon the standards H H; but when both jaws are made movable to close upon the intermediate head-plate I contemplate dispensing entirely with this yielding movement of the head-plate or anvil and of securing the same against any movement in the direction of the movement of the jaws. One of the head-plates L, instead of being fixed to its guide-block, is secured to one or more rods, *t t*, passing freely through said block, and which permit the plate to move to a limited extent to and from the same at right angles thereto. A spring is interposed between the block and plate to force out the latter automatically, so that when a can is inserted between the two head-plates, L L′, said spring shall, by its pressure, force the one toward the other upon the can with sufficient power to confine and secure the loose heads upon the can until they are clamped by the jaws, as shown in Fig. 5. The pressure of this spring is overcome and the movable head-plate L is withdrawn from the can to permit a removal of the latter by means of a rod and bu.ton or handle, R, or other suitable device. M is a support, which may be used to sustain the can in proper horizontal position after one end has been placed against the head-plate L and until the movable head-plate L′ has been brought to bear upon its opposite end. This support is secured to a movable rod, *d*, upheld by a spring within the bed-plate so that it may yield as the can is depressed by the movement of the jaws.

In operating this machine, the movable jaws are lifted or opened, as illustrated in Fig. 2, and the head-plate L withdrawn or retracted to permit the ready insertion of the can W against and upon the opposite head-plate. The unfinished can having its heads or ends C′ placed loosely upon the body with their projecting partially-folded edges properly overlapped, as shown in Fig. 2, is then placed upon and against the head-plate L′ and the opposite head-plate L is suffered to close upon it, thus securing it between said plates and affording an inner continuous solid support to the projecting joint at each end. The clamping-jaws D are then closed by the power of the press. So soon as the jaws press upon the upper corners and edges of the can the head-plates yield until the lower corners and edges strike the lower jaws B, when the resistance of said jaws and of the head-plates to the movement of the upper jaws will operate to clamp and tightly compress and close the seams of the joints. The corners embraced within the jaws are not only perfectly closed, but are very neatly finished. The other two corners are likewise closed and finished, but may be improved by turning the can and repeating the compressing-movement. The head-plates L L′ and the jaws B D may all be so secured as to admit of being detached and replaced by other forms and sizes thereof to work upon various forms and sizes of cans.

I contemplate the use of the machine in folding and closing all manner of seams in metallic vessels, and upon round, flaring, or straight seams.

It is evident that the machine may be arranged in such manner as that the jaws or compressing-plates shall move and close upon the seams of the can or other vessel horizontally instead of vertically; that each of the jaws or compressing-plates may be made movable; and that any suitable means of obtaining pressure may be employed without departing from my invention, and I contemplate all such variations in the operation and arrangement of my machine.

I claim as my invention—

1. One or more yielding end-supporting or anvil-plates adapted to bear upon the ends or heads of a sheet-metal can, within the projecting edges of the flanged joints thereof, and so arranged between jaws made to close upon and clamp said joints as to yield to the movement of the jaws until the seams are closed and clamped, substantially as for the purpose herein set forth.

2. In combination with compressing-jaws, operating substantially as herein described, to close the end joints of sheet-metal cans, a supporting plate or anvil adapted to fit within and support the projecting edges of said joints, and arranged to move to and from an opposite anvil-plate, so as to confine the can between said plates and between the jaws to permit the seams of the two heads or ends of the can to be closed at one operation, and, when closed, allow a ready removal of the can, all substantially as herein set forth.

3. In combination with an intermediate fixed or movable supporting plate or anvil, angular clamping-jaws adapted to be moved against the angles or corners of the projecting end seams or joints of a rectangular sheet-metal can placed thereon and formed to embrace said corners and to close and clamp between them the entire end seams or joints of the can, all substantially as herein set forth.

4. In combination with compressing-jaws adapted and arranged to close the joints at the two ends of a metallic vessel, an intermediate elastically-yielding supporting-plate M, substantially as herein set forth.

As witness my hand hereto this 22d day of January, 1872.

E. T. COVELL.

In presence of—
GEORGE S. DOTEN,
GEO. CALLAHAN.